United States Patent [19]

Cox

[11] Patent Number: 4,984,347
[45] Date of Patent: Jan. 15, 1991

[54] METHOD FOR ATTACHING A DOUBLER TO A SKIN STRUCTURE

[75] Inventor: Ronald L. Cox, Long Beach, Calif.
[73] Assignee: McDonnell Douglas Corporation, Long Beach, Calif.
[21] Appl. No.: 348,872
[22] Filed: May 5, 1989
[51] Int. Cl.⁵ .......................................... B23P 19/08
[52] U.S. Cl. ........................... 29/402.06; 29/402.12; 29/402.14; 29/525.2; 52/787; 428/548; 428/594
[58] Field of Search ............ 29/401.1, 402.01, 402.04, 29/402.06, 402.07, 402.09, 402.11, 402.12, 402.14, 402.15, 525.1, 525.2; 52/208, 787; 411/43, 67; 428/545, 548, 594

[56] References Cited

U.S. PATENT DOCUMENTS

| | | | |
|---|---|---|---|
| 2,834,998 | 5/1958 | Wilder | 52/208 |
| 4,069,573 | 1/1978 | Roger, Jr. et al. | 29/402.09 X |
| 4,115,911 | 9/1978 | Poole et al. | 29/402.12 |
| 4,577,450 | 3/1986 | Large | 52/787 |

FOREIGN PATENT DOCUMENTS 1384360  3/1988  U.S.S.R. ............ 29/402.14

Primary Examiner—Joseph M. Gorski
Assistant Examiner—Peter D. Vo
Attorney, Agent, or Firm—Ben J. Yorks; George W. Finch; John P. Scholl

[57] ABSTRACT

A method and the resulting structure for attaching a doubler to the damaged skin of an airplane, using the original fastener holes, where the fastener countersinks are filled with interference fitted washers and the new fasteners have an interference fit with the airplane skin, doubler and washers.

6 Claims, 4 Drawing Sheets

METHOD FOR ATTACHING A DOUBLER TO A SKIN STRUCTURE

BACKGROUND OF THE INVENTION

During the life of an airplane there are occasions when the skin of the plane is damaged and must be repaired. Present techniques include fastening a sheet of new skin, commonly referred to as a doubler, on the damaged area. This is usually accomplished by removing the fasteners in the original skin, placing the doubler over the skin, drilling a hole through the doubler and inserting a new fastener into the skin and doubler.

The outside surface of the original skin usually has a countersunk hole to allow a countersunk fastener to fit flush with the surface of the skin. When a doubler is added and the new fastener is inserted, the countersink leaves a space between the original skin and the new fastener. This space degrades the structural integrity of the airplane skin. To eliminate this space a washer is bonded into the countersink. The doubler is then placed over the skin and a new larger hole is drilled through the skin, washer and doubler and a new fastener is pressed into the hole. If the bond between the washer and the skin is not strong enough, the washer will break away and spin when drilling is attempted. When this occurs the drill is unable to penetrate the washer and doubler, and the washer must be taken out. To replace the washer, the whole doubler must be removed, a process that is costly and time consuming if other fasteners have already been installed in the doubler.

One solution has been to put in a washer with an inner hole diameter larger than the drill, to allow the drill to go through the washer and into the doubler without interference from the washer. But the oversized inner hole again leaves a space between the new fastener and the washer increasing the stress on the fastener.

SUMMARY OF INVENTION

This invention is a method and the resulting structure for attaching a doubler to the skin of an airplane. A fastener is removed from the airplane skin leaving a first fastener hole with a first countersink in the airplane skin. A doubler is placed over the skin, and a second fastener hole is drilled through the skin and doubler at the location of the first fastener hole. With this method the conical washer is not in the first countersink when the second fastener hole is drilled; this allows drilling of the doubler without interference from the washer.

The doubler is then removed, and a second countersink is drilled into the second fastener hole of the doubler. A conical washer is placed in the first countersink and the doubler is placed on top of the skin covering the washer. An expansion tool is then forced through the doubler, washer and airplane skin expanding the second fastener holes of the doubler, washer and airplane skin. The expansion of the washer hole creates an interference fit between the washer and the airplane skin. A new fastener is then pressed into the enlarged hole of the doubler, washer and skin such that there is an interference fit between the fastener and the doubler, washer and airplane skin.

By forcing a expansion tool through the second fastener hole of the airplane skin, doubler and washer, the three members obtain the same hole diameter, which insures that the interference fit of the new fastener will occur without any space or gaps between the new fastener and the washer. This produces improved fastener strength because the load on the fastener is transmitted through and shared by the washer and airplane skin. The hole expansion also generates a compressive stress at the fastener hole surface which improves the fatigue life of the joint. If a coining mandrel is used as the expansion tool, the planishing of the second fastener hole by the mandrel creates a smooth surface along the hole which eliminates sources for fatigue cracks.

DETAILED DESCRIPTION OF INVENTION

Figure 1:
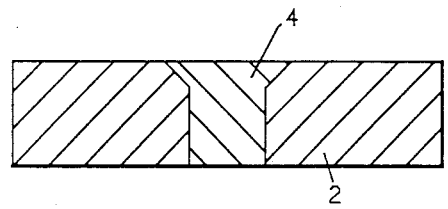
FIG. 1 is a cross-section of an airplane skin with a first fastener.
Figure 2:
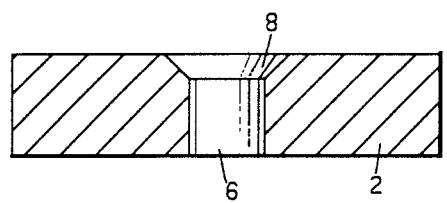
FIG. 2 is a cross-section of an airplane skin with the first fastener removed.
Figure 3:
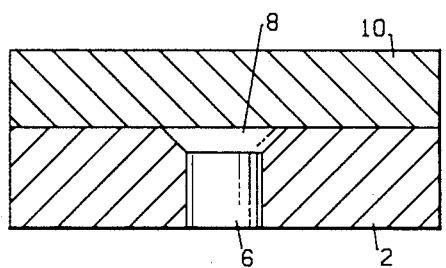
FIG. 3 is a cross-section of an airplane skin with a doubler on top of the skin.
Figure 11:
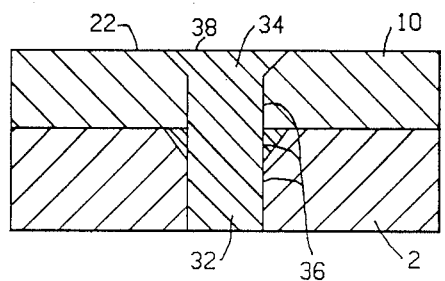
FIG. 11 is a cross-section of an airplane skin, washer and doubler with a second fastener Pressed into the fastener hole.
Figure 12:
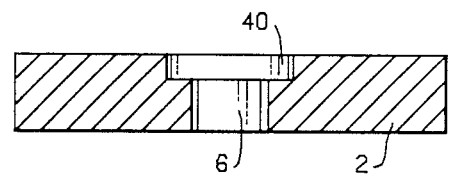
FIG. 12 is a cross-section of an airplane skin with a fastener hole and a counterbore.
Figure 13:
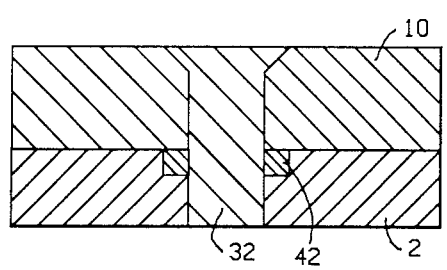
FIG. 13 is a cross-section of an airplane skin, flat washer and doubler with a second fastener pressed into the fastener hole.
Figure 14:
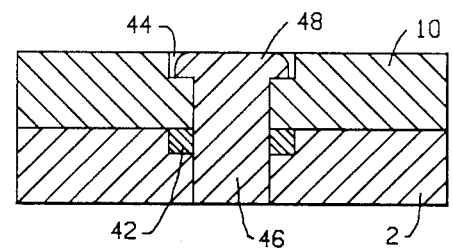
FIG. 14 cross-section of an airplane skin, flat washer and doubler with a third round head fastener pressed into the fastener hole.

Referring to the drawings more particularly by reference numbers, FIGS. 1 through 11 illustrate the method of installation for countersunk holes, while FIGS. 12 through 14 illustrate the method for counterbore holes. The corresponding apparatus is readily apparent. FIG. 1 shows an airplane skin 2 with a first fastener 4 inserted. As shown by FIG. 2, the first fastener 4 is removed from the airplane skin 2, creating a first fastener hole 6 and a first countersink 8. A doubler 10 is placed on top of the airplane skin 2 covering the first countersink 8, see FIG. 3.

Figure 4:
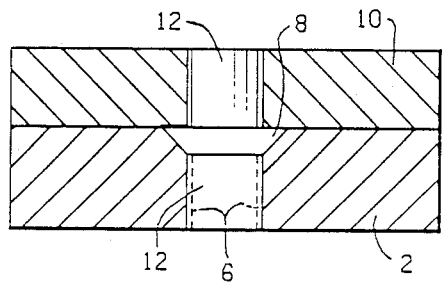
FIG. 4 is a cross-section of an airplane skin and doubler with a second fastener hole drilled through the airplane skin and doubler.
Figure 5:
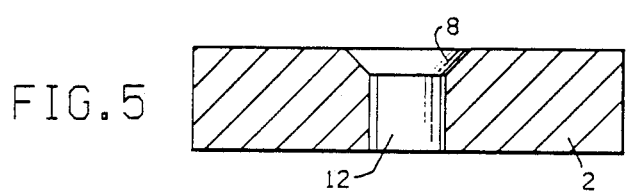
FIG. 5 is a cross-section of an airplane skin with the doubler removed.
Figure 6:
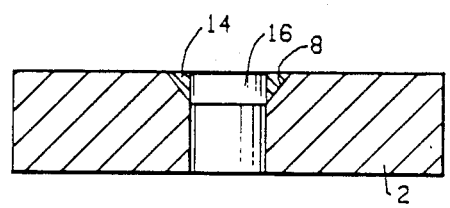
FIG. 6 is a cross-section of an airplane skin with a conical washer placed in the airplane skin countersink.
Figure 7:
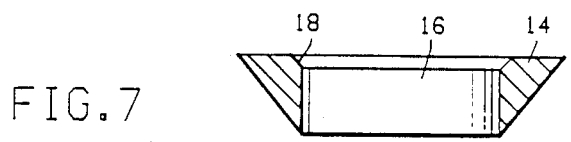
FIG. 7 is a cross-section of an conical washer with a chamfer on the inner circumference of the washer.
Figure 8:
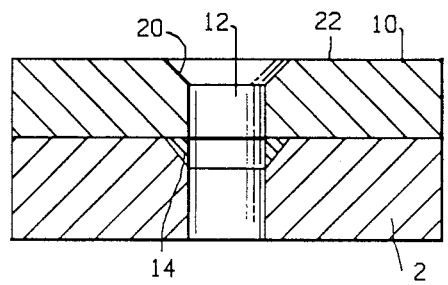
FIG. 8 is a cross-section of an airplane skin and conical washer with a doubler placed on top of the airplane skin.

FIG. 4 shows a second fastener hole 12 in the airplane skin 2 and doubler 10, where the diameter of the second fastener hole 12 is larger than the diameter of the first fastener hole 6. The doubler 10 is then removed, FIG. 5, the airplane skin 2 is deburred and a conical washer 14 with an inner diameter 16 is placed into the first countersink 8, FIG. 6. The conical washer 14 has the same dimensions as the first countersink 8 and may have a lead in chamfer 18 at the top edge of the inner diameter 16, FIG. 7. A second countersink 20 is drilled in the doubler second fastener hole 12 on the doubler surface 22 opposite the first countersink 8. The doubler 10 is then placed on top of the airplane skin 2 covering the conical washer 14, FIG. 8.

Figure 9:
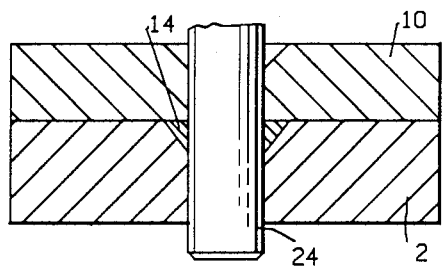
FIG. 9 is a cross-section of a expansion tool being forced through the doubler, washer and airplane skin.

FIG. 9 shows an expansion tool 24 that is pressed through the second fastener holes 12 of the airplane skin 2 and doubler 10 and the inner diameter 16 of the conical washer 14. The expansion tool could be either a coining mandrel or a split sleeve. The chamfer 18 of the inner diameter 16 leads the expansion tool 24 into the washer 14. The outside diameter of the expansion tool 24 is larger than the diameter of the second fastener hole 12 and the washer inner diameter 16, such that when the expansion tool 24 is pressed through the second fastener hole 12 and washer inner diameter 16, the diameter of the second fastener hole 12 and washer inner diameter to the outside diameter of the expansion tool 24, creating a third fastener hole 26 in the airplane skin 2, conical washer 14 and doubler 10, FIG. 10.

Figure 10:
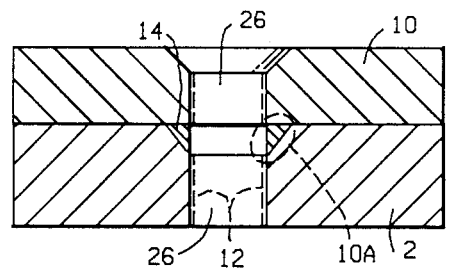
FIG. 10 is a cross-section of an airplane skin, washer and after the expansion tool has been removed.
Figure 10A:
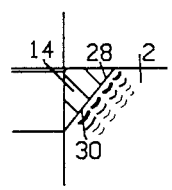
FIG. 10a is an exploded view of the washer-airplane skin interface.

The expansion of the washer inner diameter 16 by the expansion tool 24 causes the tapered surface 28 of the conical washer 14 to push against the countersunk surface 30 of the airplane skin 2. This washer 14 expansion produces an interference fit between the conical washer 14 and airplane skin 2, creating compressive stresses in the airplane skin 2 along the countersunk surface 30, FIG. 10a.

In FIG. 11, a second fastener 32 with a conical head 34 is pressed into the third fastener hole 26 of the airplane skin 2, conical washer 14 and doubler 10, resulting in an interference fit between the second fastener 32 and the airplane skin 2, conical washer 14 and doubler 10. The interference fit between the second fastener 32 and the airplane skin 2, conical washer 14 and doubler 10 creates compressive stresses in the airplane skin 2, conical washer 14 and doubler 10 at the third fastener hole surface 36. The conical head 34 fits into the second countersink 20 allowing the top 38 of the conical head 34 to lie flush with the doubler surface 22. The placement of the second fastener head 34 at or below the doubler surface 22 reduces drag on the airplane during flight.

The same method may be used when the removal of the first fastener 4 creates a first fastener hole 6 and a first counterbore 40, FIG. 12. In this configuration a flat washer 42 is used with a resulting structure as shown in FIG. 13. The doubler 10 may have a second counterbore 44 drilled instead of the second countersink 20 and a third fastener 46 with a round or socket head 48 would be interference fitted into the third fastener hole 26.

The previously described method is not limited to just airplanes, but may be used to repair structures such as pressure vessels, ships, tanks, pipe lines and other skin repairing members.

What is claimed is:

1. A method for attaching a doubler to a skin of a structure, where the skin has a fastener hole with a first diameter and a first countersink, comprising the steps of:
   (a) placing a doubler on said skin covering said first countersink;
   (b) drilling a fastener hole in said doubler at a location concentrically above said fastener hole of said skin to a predetermined second diameter, said drilling enlarging said fastener hole of said skin to said second diameter;
   (c) removing said doubler from said skin;
   (d) placing a conical washer with an inner diameter into said first countersink;
   (e) placing said doubler on said skin and said conical washer;
   (f) inserting a coining mandrel having a third diameter through said skin, said conical washer and said doubler, said insertion of said coining mandrel enlarging said fastener hole of said skin fastener hole in said doubler and the inner diameter of said conical washer to said third diameter, said insertion of said coining mandrel producing an interference fit between said conical washer and said skin;
   (g) removing said coining mandrel from said fastener hole; and
   (h) inserting a solid fastener into said fastener hole such that said solid fastener has an interference fit with said doubler, said conical washer and said skin, whereby said solid fastener attaches said doubler to said skin.

2. The method as recited in claim 1 wherein said conical washer has a chamfer that leads said coining mandrel through the inner diameter of said conical washer when said coining mandrel is inserted through said doubler, said conical washer and said skin as recited in step (f).

3. The method as recited in claim 1 further comprising the steps of drilling a second countersink into said fastener hole of said doubler, after said doubler is removed from said skin, as recited in step (c).

4. A method for attaching a doubler to a skin of a structure, where the skin has a fastener hole with a first diameter and a first counterbore, comprising the steps of:
   (a) placing a doubler on said skin covering said first counterbore;
   (b) drilling a fastener hole in said doubler at a location concentrically above said fastener hole of said skin to a predetermined second diameter, said drilling enlarging said fastener hole of said skin to said second diameter;
   (c) removing said doubler from said skin;
   (d) placing a conical washer with an inner diameter into said first counterbore;
   (e) placing said doubler on said skin and said conical washer;
   (f) inserting a coining mandrel having a third diameter through said skin, said conical washer and said doubler, said insertion of said coining mandrel enlarging said fastener hole of said skin fastener hole in said doubler and the inner diameter of said conical washer to said third diameter, said insertion of said coining mandrel producing an interference fit between said conical washer and said skin;
   (g) removing said coining mandrel from said fastener hole; and
   (h) inserting a solid fastener into said fastener hole such that said solid fastener has an interference fit with said doubler, said conical washer and said skin, whereby said solid fastener attaches said doubler to said skin.

5. The method as recited in claim 4 wherein said conical washer has a chamfer that leads said coining mandrel through the inner diameter of said conical washer when said coining mandrel is inserted through said doubler, said conical washer and said skin as recited in step (f).

6. The method as recited in claim 4 further comprising the steps of drilling a second counterbore into said fastener hole of said doubler, after said doubler is removed from said skin, as recited in step (c).

* * * * *

UNITED STATES PATENT AND TRADEMARK OFFICE
CERTIFICATE OF CORRECTION

PATENT NO. : 4,984,347
DATED : 15 January 1991
INVENTOR(S) : Ronald L. Cox It is certified that error appears in the above—identified patent and that said Letters Patent is hereby corrected as shown below:

On the Title page

In the Abstract, line 2, delete the word "damaged".

In column 2, line 32 insert --doubler-- after the word "and".

In column 2, line 43 insert --is a-- after "FIG. 14".

In column 3, line 17 insert --16 is enlarged-- after the word "diameter".

In column 4, line 8, insert --and-- after the word "skin".

In column 4, line 47, insert --and said-- after the word "skin".

In column 4, line 48 change the word "in" to --of--.

In column 4, line 9, change the word "in" to -- of--.

Signed and Sealed this

Twenty-sixth Day of January, 1993

*Attest:*

STEPHEN G. KUNIN

*Attesting Officer*  *Acting Commissioner of Patents and Trademarks*